(12) United States Patent
Wakiyama (10) Patent No.: US 7,457,954 B2
(45) Date of Patent: Nov. 25, 2008

(54) COMMUNICATIONS SYSTEM AND PACKET STRUCTURE

(75) Inventor: Kenichi Wakiyama, Kariya (JP)

(73) Assignee: Denso Corporation, Kariya (JP)

( * ) Notice: Subject to any disclaimer, the term of this patent is extended or adjusted under 35 U.S.C. 154(b) by 550 days.

(21) Appl. No.: 10/852,190

(22) Filed: May 25, 2004

(65) Prior Publication Data

US 2005/0010759 A1  Jan. 13, 2005

(30) Foreign Application Priority Data

Jun. 18, 2003 (JP) ............................. 2003-173851
Dec. 5, 2003 (JP) ............................. 2003-407832

(51) Int. Cl.
*H04L 1/00* (2006.01)
(52) U.S. Cl. ..................................... 713/170
(58) Field of Classification Search ............ 713/160, 713/168, 170
See application file for complete search history.

(56) References Cited

U.S. PATENT DOCUMENTS

| 4,661,657 | A  | * | 4/1987 | Grenzebach et al. | ......... | 713/160 |
| 6,343,341 | B1 | * | 1/2002 | Cabrera et al. | ............... | 711/111 |
| 6,918,034 | B1 | * | 7/2005 | Sengodan et al. | ........... | 713/160 |
| 2001/0043702 | A1 | * | 11/2001 | Elteto et al. | .................. | 380/278 |
| 2003/0012181 | A1 | * | 1/2003 | The | .............................. | 370/352 |
| 2003/0131233 | A1 | * | 7/2003 | Garstin et al. | ............... | 713/160 |

FOREIGN PATENT DOCUMENTS

| JP | A-7-131449 | 5/1995 |
| JP | A-10-143724 | 5/1998 |
| JP | A-10-269290 | 10/1998 |
| JP | A-2001-127747 | 5/2001 |
| JP | A-2001-318600 | 11/2001 |

OTHER PUBLICATIONS

"A procedure for the message authentication" in a web page URL:http://www5d.biglobe.ne.jp/~engineer/doc/security/security_ch3_01.htm, Oct. 20, 2003 (Discussed on p. 3 of the specification).
Eiji Okamoto, *Introduction +0 Encryption Theory*, p. 129-132, Kyouritsu Syuppan Kabushiki-Gaisha, Feb. 25, 1993 (Concise explanation in English translation of Office Action).
Office Action dated Mar. 11, 2008 in corresponding Japanese Patent Application No. 2003-173851 (and English translation).

* cited by examiner

*Primary Examiner*—Nasser Moazzami
*Assistant Examiner*—Edward Zee
(74) *Attorney, Agent, or Firm*—Posz Law Group, PLC (57) ABSTRACT

In a communications system, a transmitter transmits message data included in communications packets to a receiver. A data region of the communications packet includes an original data region D[n], an authentication data region P[n], and a control region C. The original data region D[n] includes data as a transmission object that is the message data itself or one of the data portions into which the message data is divided so that each of the data portions can be contained in a single packet. The authentication data region P[n] includes authentication information used for substitution detection of the data included in the original data region D[n]. The control region C includes control information. This structure enables the substitution detection to be performed with respect to the respective communications packets into which the message data is divided, resulting in decrease in the substitution detection period.

24 Claims, 9 Drawing Sheets

D[n] : ORIGINAL DATA
P[n] : AUTHENTICATION
C : CONTROL

COMMUNICATIONS SYSTEM AND PACKET STRUCTURE

CROSS REFERENCE TO RELATED APPLICATIONS

This application is based on and incorporates herein by reference Japanese Patent Applications No. 2003-173851 filed on Jun. 18, 2003 and No. 2003-407832 filed on Dec. 5, 2003.

FIELD OF THE INVENTION

The present invention relates to a communications system executing a message authentication.

BACKGROUND OF THE INVENTION

Conventionally, a message authentication is used for detecting substitution that a third party executes to message data communicated via a communications network. In a typical message authentication, a transmitter transmits message data and an authenticator that is generated by compressing a feature of the message data and encrypting it; a receiver receives all the data from the transmitter to execute, using the received authenticator, substitution detection of whether the received message data is really sent by the transmitter or not.

Figure 9:
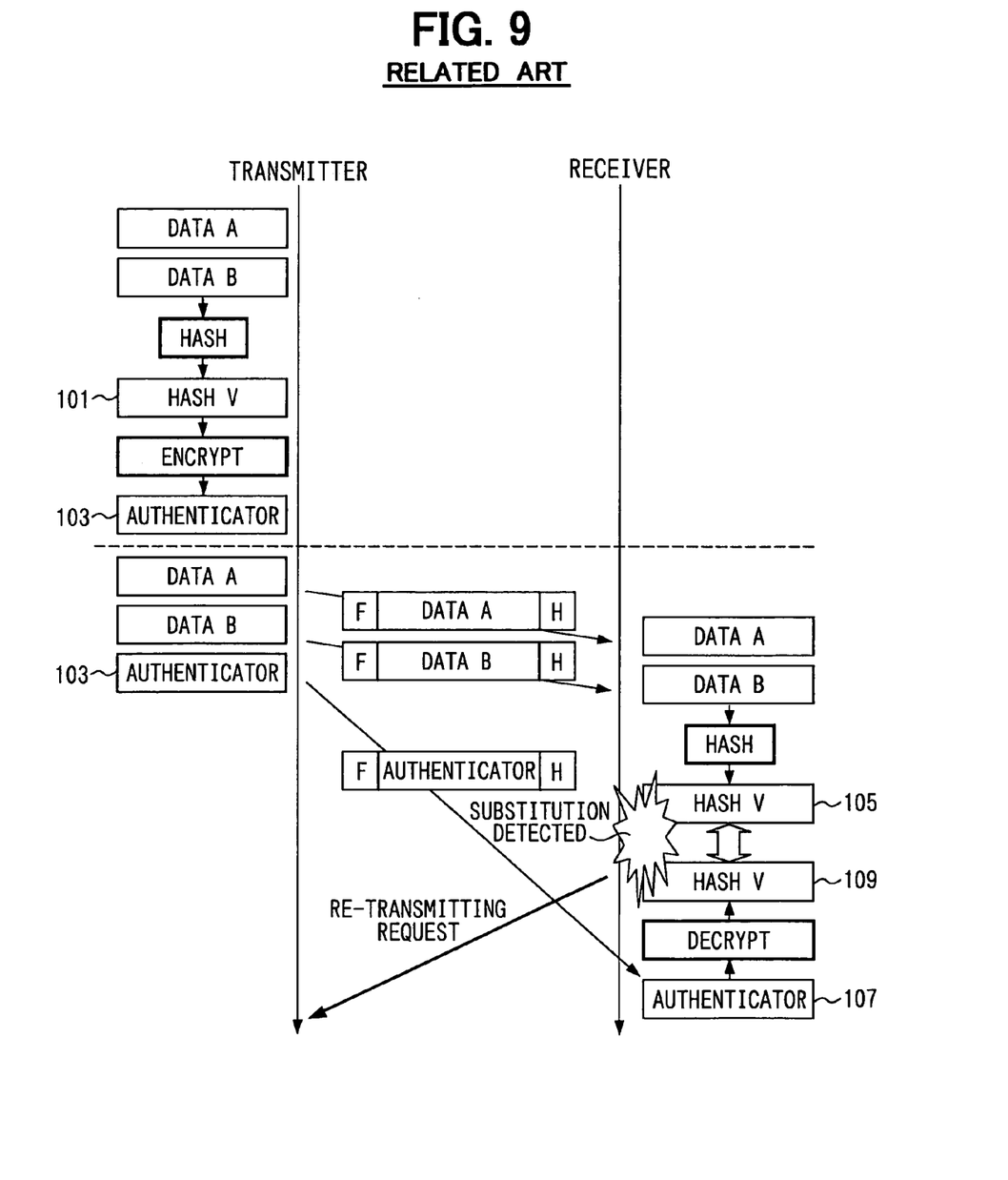
FIG. 9 is a diagram showing a related art.

For instance, as shown in FIG. 9, a transmitter applies a process of a hash function of a one-way function to message data (consisting of DATA A and DATA B) that is to be sent, to thereby generate a hash value 101; the hash value 101 is then encrypted to generate an authenticator (message authenticator) 103. Here, the message data is divides into DATA A and DATA B that can be contained in the packets, respectively. The transmitter further generates packets (communications packets). In each packet, each of DATA A, DATA B, and the authenticator 103 that is generated as explained above is accompanied by an individual header and footer complying to a communications protocol. The transmitter then serially transmits the packets to the receiver. In FIG. 9, an authenticator is contained in only a single packet; however, when a data volume of the authenticator becomes large, the authenticator is divided into and included in the multiple packets.

By contrast, after receiving all the data (in this example, DATA A, DATA B, and authenticator) from the transmitter, the receiver applies the process of the hash function to message data, which is formed by combining DATA A and DATA B, to generate a hash value 105. The receiver further decrypts the received authenticator 103 to generate a hash value 109, then comparing both authenticators 105, 109.

When both authenticators 105, 109 are equal, the received message data (DATA A and DATA B) is determined to be not substituted while being communicated, namely, the received message data is determined to be really sent by the transmitter. By contrast, when both authenticators 105, 109 are unequal, the received message data (DATA A and DATA B) is determined to be substituted while being communicated, namely, the received message data is determined not to be sent by the transmitter. A request for retransmitting is thereby sent to the transmitter. The transmitter then transmits the message data and authenticator again.

Thus, in the typical message authentication, the transmitter transmits the message data and authenticator; after receiving both the message data and authenticator, the receiver detects the substitution by determining whether the same authenticator can be generated from the received massage data.

Here, the above-mentioned method for generating the message authenticator is described, for instance, in JP-A-2001-318600. Further, a procedure for the message authentication was retrieved in a Web page Oct. 20, 2003.

In the above conventional method, the substitution detection cannot be executed until the receiver receives all the data, which results in a long substitution detection period that is a period from when the communications data is substituted up to when the substitution is detected.

SUMMARY OF THE INVENTION

It is an object of the present invention to shorten a substitution detection period of communications data by applying a substitution detection to each of communications packets into which message data is divided.

To achieve the above object, a communications system is provided with the following. A transmitter transmits, to a receiver, message data as a plurality of packets, wherein each of the packets includes a data region. The data region comprises: transmission object data that is one of division portions into which the message data is divided so that each of the division portions is contained within each of the packets; authentication information used for executing substitution detection to the transmission object data; and control information that at least indicates what kind of a constituent of the message data the transmission object data is. Here, when the receiver receives each of the packets, the receiver executes, using the authentication information, substitution detection of whether the transmission object data received is normal data that is really sent from the transmitter, and restructures the message data from the received transmission object data based on the received control information.

In this structure, substitution detection is executed with respect to each of the packets into which message data is divided, so that a period for the substitution detection can be shorten. Further, when the substitution to communications data is detected, a retransmitting request is needed only for the packet where the substitution is detected. When communications data is substituted, a frequency and volume for retransmitting data can be thereby decreased. This can restrict increase of the communications traffics in the relevant communications line.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
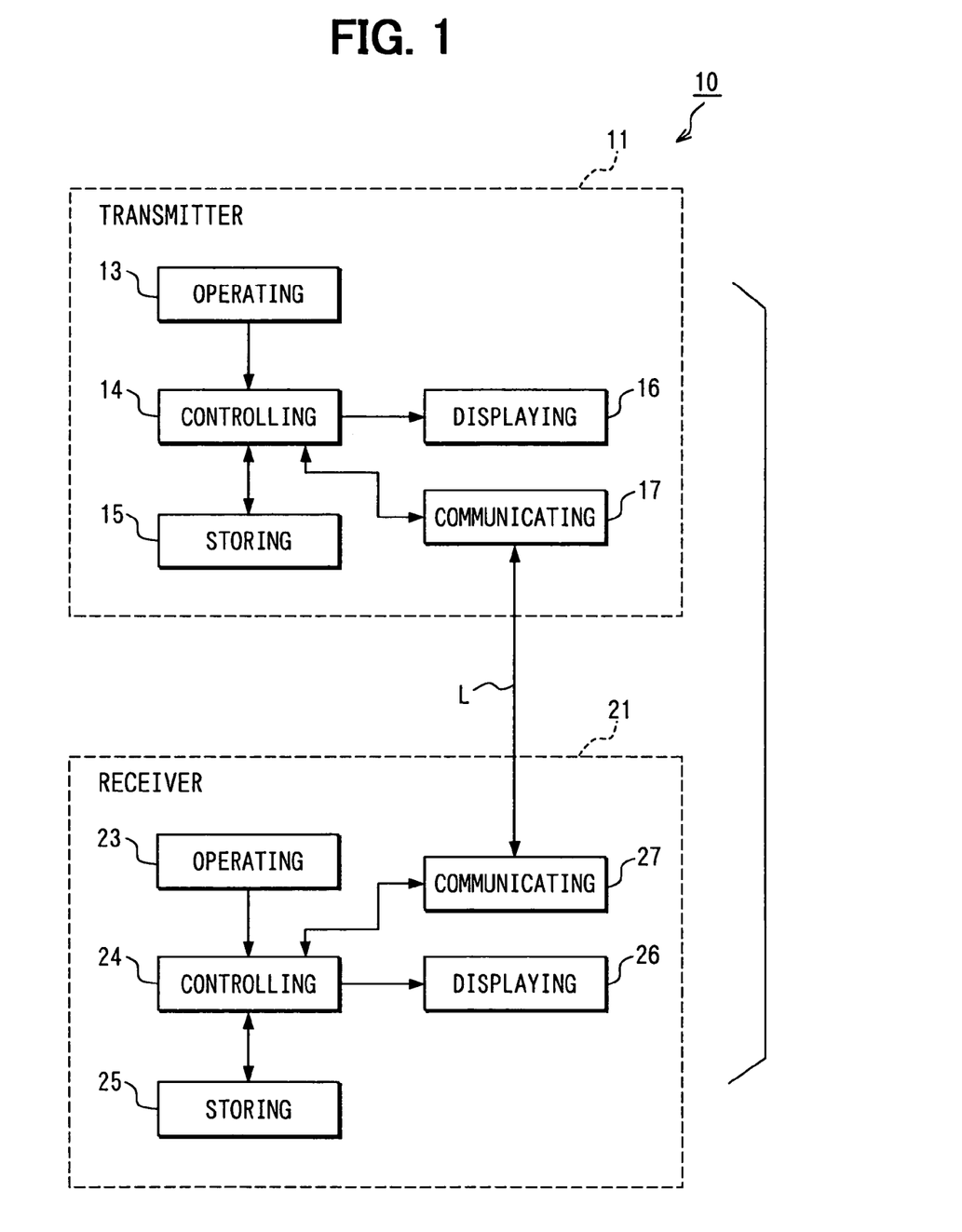
FIG. 1 is a block diagram showing a structure of a communications system according to an embodiment of the present invention.

A structure of a communications system 10 according to an embodiment of the present invention is shown in FIG. 1. The communications system 10 includes a transmitter (transmitter unit) 11 and a receiver (receiver unit) 21.

The transmitter 11 includes an operating section 13, a controlling section 14, a storing section 15, a displaying section 16, and a communicating section 17. The operating section 13 is constructed of a touch-panel or key switches, accepting operation instructions from a user. The storing section 15 includes a memory storage where data can be read out and written, such as a RAM, an EEPROM, a hard disk drive, etc. to store data handed over by the controlling section 14 or to hand over data requested from the controlling section 14.

The displaying section 16 is constructed of a liquid crystal display, an organic EL display, etc. to display various information by instructions from the controlling section 14. The communicating section 17 is connected with the receiver 21 via a communications line L to perform a communication function such as protocol treatment while communicating with the receiver 21. The controlling section 14 is constructed of a known CPU, a ROM, a RAM, a bus connecting the foregoing components, etc. to execute a transmitting process based on a program stored in the above ROM, which will be explained later.

By contrast, the receiver 21 includes an operating section 23, a controlling section 24, a storing section 25, a displaying section 26, and a communicating section 27. The operating section 23 is constructed of a touch-panel or key switches, accepting operation instruction from a user. The storing section 25 includes a memory storage where data can be read out and written such as a RAM, an EEPROM, a hard disk drive, etc. to store data handed over by the controlling section 24 or to hand over data requested from the controlling section 24.

The displaying section 26 is constructed of a liquid crystal display, an organic EL display, etc. to display various information by instructions from the controlling section 24. The communicating section 27 is connected with the transmitter 11 via the communications line L to perform a communication function such as protocol treatment while communicating with the transmitter 11. The controlling section 24 is constructed of a known CPU, a ROM, a RAM, a bus connecting the foregoing components, etc. to execute a receiving process based on a program stored in the above ROM, which will be explained later.

In the communications system 10 having this hardware structure, the transmitter 11, as needed, divides the message data of a transmission object stored in the storing section 15 into portions, each of which corresponds to a single packet. The transmitter 11 then sequentially transmits to the receiver 21 the packets with their data regions including the divided portions of the message data.

Further, in the communications system 10 of this embodiment, a data length of single message data is from one (1) to eight (8) bytes. The message data of this embodiment includes character data that the user previously inputs by operating the operating section 13 to store it in the storing section 15; however, the message data can be sent from other devices and stored in the storing section 15. Further, the message data can be image data, moving image data, voice data, control data for controlling a control object such as control data by which an electronic control unit controls control objects, without being limited to the character data.

Figure 2A:
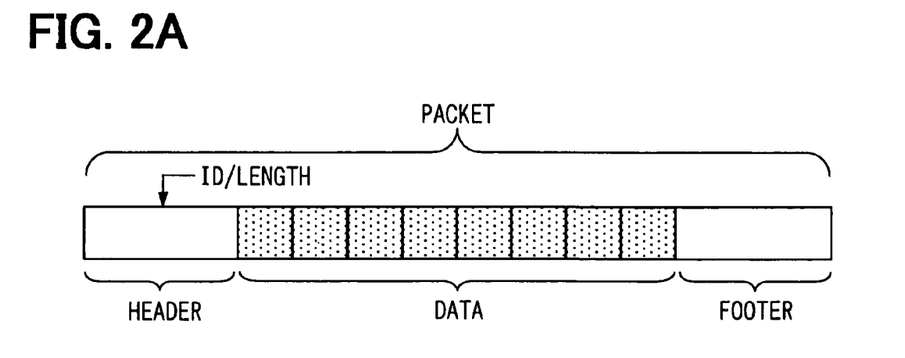
FIGS. 2A to 2C are diagrams explaining a structure of a communications packet.

Next, a structure of a packet (communications packet) that is sent from the transmitter 11 to the receiver 21 will be explained with reference to FIG. 2. Here, the communications system 10 of this embodiment uses, as a communications protocol, a CAN (Controller Area Network) protocol that is widely used in in-vehicle devices. Accordingly, as shown in FIG. 2A, the communications packet includes a data region of 8 bytes (64 bits) at maximum, a header region disposed forward of the data region, and a footer region disposed backward of the data region. The header region includes data length information indicating a length (or size) of the data region and identification (ID) information indicating a data type of the data region.

Here, in this embodiment, the data region is constantly set to 8 bytes at maximum, so that the data length information of the header region is set to a value constantly indicating 8 bytes. Further, the 8-byte data region includes original transmission object data and other information necessary for message authentication (substitution detection) and communications control. In this regard, this communications system is greatly differentiated from a known communications system using the CAN protocol. Here, the original transmission object data is data that should be sent from the transmitter 11 to the receiver 21 (namely, partial or entire message data, hereinafter, referred to as original data).

Figure 2B:
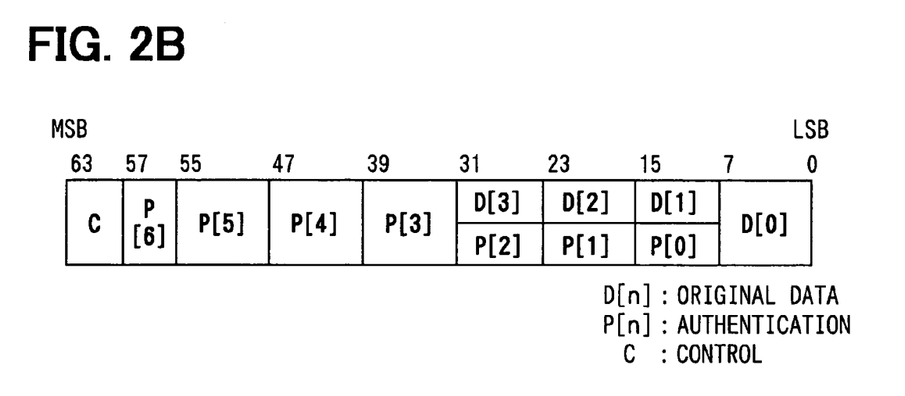

Namely, as shown in FIG. 2B, the 8-byte data region includes, from LSB end to MSB end, an original data region D[n] where the original data is disposed, an authentication data region P[n] where authentication data for substitution detection for the original data is disposed, and a control region C where control information is disposed. The size of the original data region D[n] is variable from 1 byte to 4 bytes every one byte; the size of the authentication data region P[n] is variable from 26 bits to 50 bits; and the size of the control region C is constantly six bits. Namely, depending on the size of the original data, the number of bits of the authentication data can be varied, while that of the control information is fixed to six bits.

Here, each of the storing sections 15, 25 of the transmitter 11 and receiver 21 stores the same 50 bit quasi random number that is previously generated using a random function, as an initial value of authentication data. When the number of bits of the original data is defined as DS (8 to 32 bits), the transmitter 11 fills the data region of the packet with authentication data being (58 minus DS) bits from MSB end of the 50 bit quasi random number stored in the storing section 15.

In this embodiment, the transmitter 11 and receiver 21 are started by at once being supplied with power. For instance, when being started, the controlling section 14 of the transmitter 11 generates a 50 bit quasi random number using the random function and stores it in the storing section 15, further transmitting it to the receiver 21. The same quasi random number as that stored in the storing section 15 can be thereby stored in the storing section 25 of the receiver 21. Further, for instance, it is supposed that the storing sections 15, 25 of the transmitter 11 and receiver 21 include non-volatile memory where data can be written such as EEPROM. In this case, the previously generated quasi random number can be stored in the non-volatile memory of the storing sections 15, 25 when the transmitter 11 and receiver 21 is manufactured or shipped.

Figure 2C:
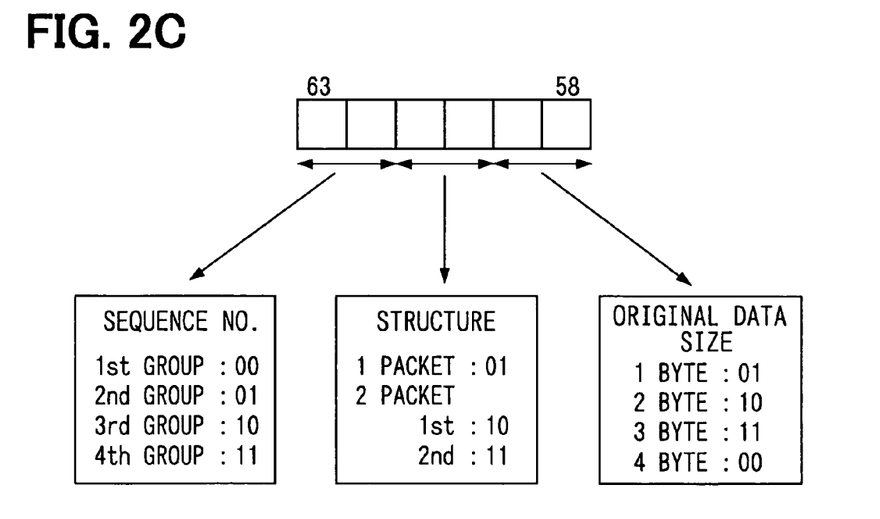

As shown in FIG. 2C, the 6-bit control information disposed in the control region C includes, from the lowest bit, data size information, packet structure information, and sequence number information. The data size information is formed of two bits indicating the size of the original data (or original data region D[n]) in the data region of the packet. The packet structure information is formed of two bits indicating the structure of the packet. The sequence number information is formed of two bits.

Further, the data size information is set to "01" when the original data is one byte; "10" when two bytes; "11" when three bytes; and "00" when four bytes.

Further, digits of 1 or 0 within " " indicates binary digit representation. Further, in this embodiment, as explained above, an alignment order of the original data region D[n], authentication data region P[n], and control region C is fixed; lengths of the entire data region and control region C are fixed. The receiver 21 thereby recognizes what is located in which position in the data region when the length of the original data region D[n] is known. Therefore, the data size information can be information indicating a structure of the data region.

Further, the packet structure information indicates whether a relevant packet belongs to a two-packet structured or one-packet structured packet, or whether the relevant packet is the first or second packet when it belongs to the two-packet structured packet. Here, when message data has four bytes or less, the message data can be sent using a single packet defined as a one-packet structured packet. When message data has five bytes or more, the message data is divided into two portions positioned in MSB and LSB sides, respectively, then being sent using two packets. Of the two packets, the first packet includes the portion positioned in the MSB side; the second packet includes the portion positioned in the LSB side. Accordingly, the message data having five bytes or more is sent using two packets, each of which is defined as a two-packet structured packet.

The packet structure information is set to "01" when a relevant packet is a one-packet structured packet; "10" when the first packet of two two-packet structured packets; and "11" when the second packet of two two-packet structured packets.

Thus, the packet structure information can indicate what kind of constituent within the message data the original data in the original data region D[n] is. When packet structure information is set to "01," the data itself in the original data region of the packet is equal to the message data, namely not a portion divided from the message data.

Figure 6A:
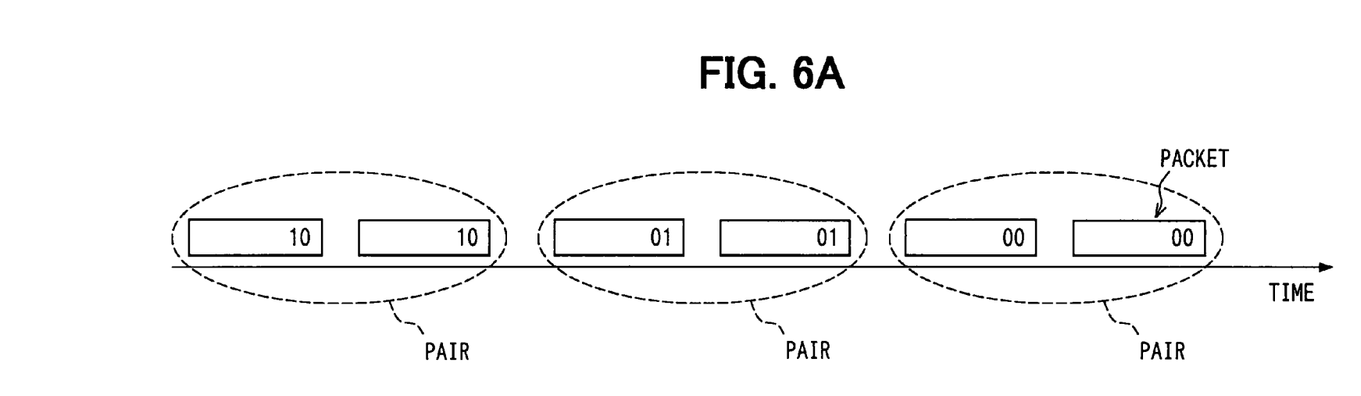
FIG. 6A is a diagram showing sequence number information included in control information.

The sequence number information is an identification number assigned to a single group, which is formed by a single one-packet structured packet or by two two-packet structured packets. The transmitter 11 assigns the sequence number information in an order of four manners of "00"→"01"→"10"→"11." When the transmitter 11 sequentially transmits to the receiver 21 two-packet structured packets, the receiver 21 is to receive pairs of packets having the same sequence numbers, as shown in FIG. 6A. Here, the sequence number information is assigned to three groups of two-packet structured packets, from the first group, in an order of "00"→"01"→"10." Thus, the sequence number information can identify a group of packets, the group which includes the data portions into which the same message data is divided.

Figure 3:
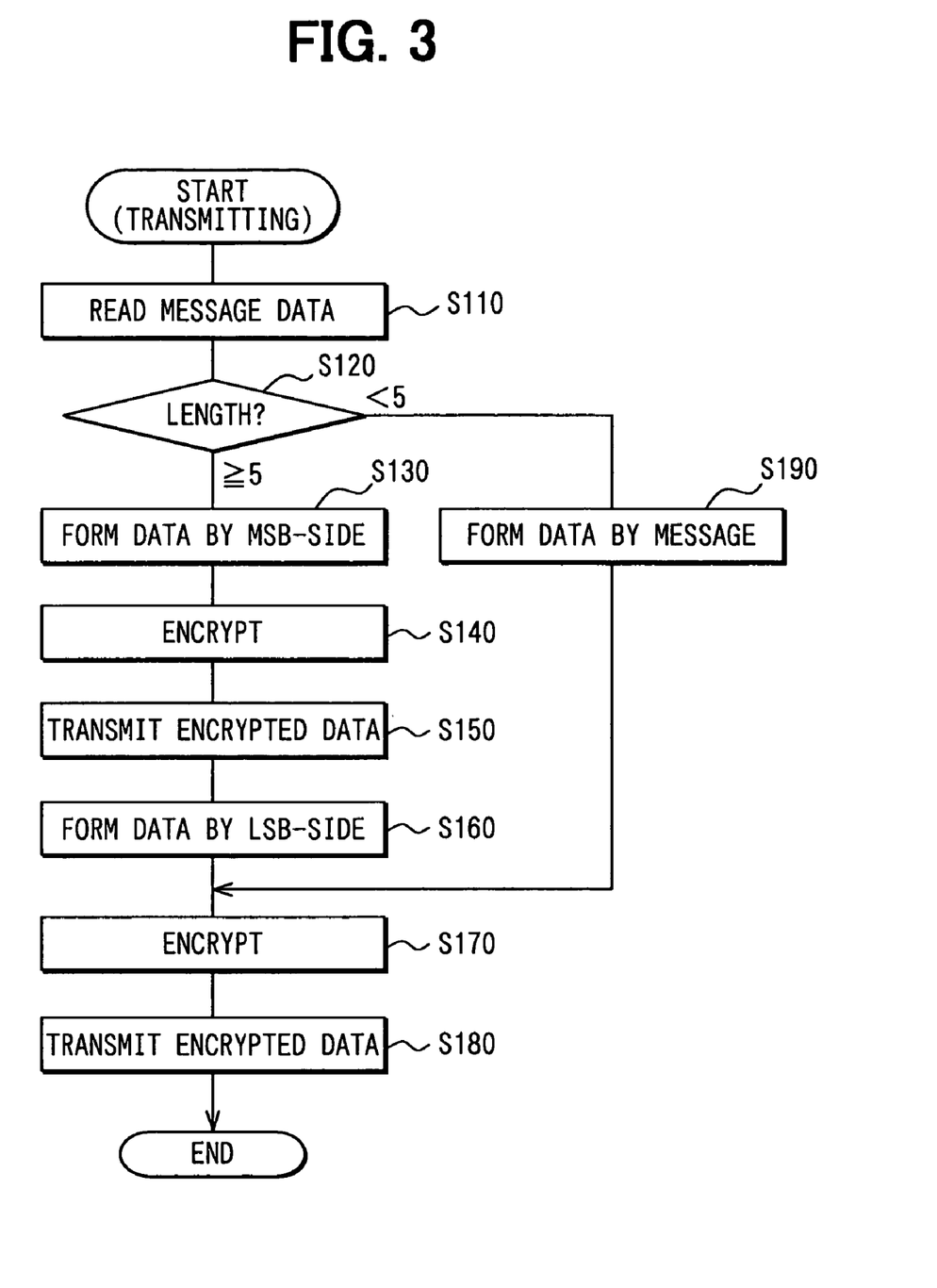
FIG. 3 is a flow chart diagram showing a transmitting process of a transmitter.

In the next place, a transmitting process of the controlling section 14 of the transmitter 11 will be explained with reference to a flow chart diagram in FIG. 3. Here, the transmitting process is executed when an event occurs, e.g., when a user inputs an instruction of transmitting message data using the operation section 13 of the transmitter 11. Further, when message data of a transmission object stored in the storing section 15 is periodically updated, this transmitting process can be executed at constant intervals.

At Step S110, message data is read out from the storing section 15 after the controlling section 14 of the transmitter 11 starts the transmitting process. At Step S120, it is determined whether a length of the read message data is not less than five bytes. When it is determined to be not less than five bytes, the process advances to Step S130.

At Step S130, the message data read at Step S110 is divided into LSB-side data that includes four bytes from LSB and MSB-side data that includes other than the LSB-side data; an 8-byte data region of a communications packet is then formed by adding, to the MSB-side data as original data of a transmission object, corresponding authentication data and control information (data size information, packet structure information, and sequence number information).

Here, the packet structure information of the control information is set to "10" (=0x2: 0x means that the number is represented by a hexadecimal system). The data size information of the control information is set to any one of "01," "10," "11," or "00" depending on the size of the MSB-side data of the transmission object. The sequence number information of the control information is set to any one of "00," "01," "10," or "11." The authentication data uses "58 minus DS" bits from the MSB of the 50 bit quasi random number when the number of bits of the MSB-side data is DS (8 to 32 bits).

At Step S140, the data region formed at Step S130 (in detail, an 8-byte data row constituting the data region) is encrypted using an encryption key previously stored in the storing section 15 by a block cipher (e.g., DES [Data Encryption Standard], FEAL [Fast Encryption Algorithm], or the like). The encryption key stored in the storing section 15 is the same (namely, common key) as that used in the receiving process to be executed by the controlling section 24 of the receiver 21.

At Step S150, the data region encrypted at Step S140 (encrypted data) and contents of a header region and footer region are outputted to the communications section 17; a communications packet (namely, the first packet of two two-packet structured packets) including the header and footer regions in addition to the data region is sent from the communications section 17 to the receiver 21.

At Step S160, an 8-byte data region of a communications packet is then formed by adding, to the remaining LSB-side data being one of the two divided data portions as original data of a transmission object, corresponding authentication data and control information (data size information, packet structure information, and sequence number information).

Here, the packet structure information of the control information is set to "11" (=0x3) that indicates the second packet of the two two-packet structured packets. The data size information of the control information is set to "00" since the LSB-side data includes four bytes. The sequence number information of the control information is set to the same value as that for the first packet set at Step S130. The authentication data uses 26 (58 minus 32) bits from the MSB of the 50 bit quasi random number since the number of bits of the LSB-side data is 32 bits (four bytes).

At Step S170, similarly at Step S140, the data region formed at Step S160 is encrypted using the encryption key previously stored in the storing section 15. At Step S180, the data region encrypted at Step S170 (encrypted data) and contents of a header region and footer region that are assigned to the data region are outputted to the communications section 17; a communications packet (namely, the second packet of two two-packet structured packets) including the header and footer regions in addition to the data region is sent from the communications section 17 to the receiver 21. Here, when the first and second packets of two-packet structured packets are sent at the process at Steps S130 to S180, the same identification information is included in each of the headers of the two packets. It is because the two packets transmit portions of the same message data.

By contrast, at Step S120, when the length of the message data read at Step S110 is determined to be less than five bytes (i.e., 1 to 4 bytes), the process advances to Step S190.

At Step S190, an 8-byte data region of a communications packet is formed by adding, to the message data itself as original data of a transmission object, corresponding authentication data and control information (data size information, packet structure information, and sequence number information).

Here, the packet structure information of the control information is set to "01" (=0x1). The data size information of the control information is set to any one of "01," "10," "11," or "00" depending on the size of the message data of the transmission object. The sequence number information of the control information is set to any one of "00," "01," "10," or "11." The authentication data uses "58 minus DS" bits from the MSB of the 50 bit quasi random number when the number of bits of the message data of the transmission object is DS (8 to 32 bits).

The process then advances to Step S170. At Step S170, the data region formed at Step S190 is encrypted using the encryption key previously stored in the storing section 15. At Step S180, the data region encrypted at Step S170 (encrypted data) and contents of a header region and footer region that are assigned to the data region are outputted to the communications section 17; a communications packet (namely, one-packet structured packet) including the header and footer regions in addition to the data region is sent from the communications section 17 to the receiver 21.

Further, in a case where message data to be sent remains in the storing section 15 when the process is terminated at Step S180, the process is resumed from Step S110; however, in a case where no message data to be sent remains, the transmitting process is terminated.

In the next place, a receiving process of the controlling section 24 of the receiver 21 will be explained with reference to a flow chart diagram in FIG. 4. Here, the receiving process is started each time the communications packet from the transmitter 11 is received by the communications section 27.

At Step S210, receiving data (this-time received communications packet) is retrieved from the communications section 27 after the controlling section 24 of the receiver 21 starts the receiving process. At Step S220, the data region of the received communications packet is then decrypted using a decryption key previously stored in the storing section 25. Here, as explained above, the decryption key stored in the storing section 25 is the same key as that stored in the storing section 15 of the transmitter 11.

At Step S230, the control information (data size information, packet structure information, and sequence number information) being upper six bits is extracted from the data region decrypted at Step S220. The packet structure information included in the extracted control information is determined.

When the packet structure information is set to "01," the packet structure of the this-time received communications packet is determined to be a one-packet structured packet, which advances the process to Step S240. Here, from the decrypted data region, the authentication data and the original data of the transmission object are extracted. Here, the original data is extracted based on the data size information of the control information extracted at Step S230; data other than the control information and original data is extracted as the authentication data.

At Step S250, it is determined whether the authentication data extracted at Step S240 accords with the authentication data known by the receiver 21. Here, the known authentication data corresponds to data bits as many as the number of bits of the authentication data extracted at Step S240, from the MSB end of the 50 bit quasi random number stored in the storing section 25. Namely, when the number of bits of the authentication data extracted at Step S240 is "XS" bits (26 to 50 bits), the known authentication data is "XS" bits from the MSB end of the 50 bit quasi random number. When the authentication data is determined to accord with the known (YES at Step S250), the original data in the data region decrypted at Step S220 is determined to be normal (not-substituted) data that is really sent from the transmitter 11. This advances the process to Step S260, where the original data extracted at Step S240 is stored as message data from the transmitter 11 in the storing section 25 or memory (e.g., RAM) of the controlling section 24. The receiving process is then terminated.

By contrast, when the authentication data is determined not to accord with the known (NO at Step S250), the original data in the data region decrypted at Step S220 is determined to be abnormal (substituted) data. This terminates the process as termination with error. Here, when the termination with error takes place, a retransmitting request is sent for requesting the transmitter 11 of retransmitting the same communications packet. The transmitter 11 thereby retransmits the same communications packet as that previously sent.

On the other hand, at Step S230, when the packet structure information is set to "10," the packet structure of the this-time received communications packet is determined to be the first packet of the two-packet structured packets, which advances the process to Step S270. Here, similarly in Step S240, from the data region decrypted at Step S220, the authentication data and the original data of the transmission object are extracted. At Step S280, similarly at Step S250, it is determined whether the authentication data extracted at Step S270 accords with the authentication data known by the receiver 21. Here, the known authentication data corresponds to data bits as many as the number of bits of the authentication data extracted at Step S270, from the MSB end of the 50 bit quasi random number stored in the storing section 25. Namely, when the number of bits of the authentication data extracted at Step S270 is "XS" bits (26 to 50 bits), the known authentication data is "XS" bits from the MSB end of the 50 bit quasi random number.

When the authentication data is determined to accord with the known (YES at Step S280), the process advances to Step S290. Here, the original data extracted at Step S270 is stored as MSB-side data of the message data from the transmitter 11 in the storing section 25 or memory (e.g., RAM) of the controlling section 24. The receiving process is then terminated.

By contrast, when the authentication data is determined not to accord with the known (NO at Step S280), the process is terminated as termination with error. Here, a retransmitting request is also sent for requesting the transmitter 11 of retransmitting the same communications packet.

Further, at Step S230, when the packet structure information is set to "11," the packet structure of the this-time received communications packet is determined to be the second packet of the two-packet structured packets, which advances the process to Step S300. Here, similarly at Steps S240, S270, from the data region decrypted at Step S220, the authentication data and the original data of the transmission object are extracted. At Step S310, similarly at Steps S250, S280, it is determined whether the authentication data extracted at Step S300 accords with the authentication data known by the receiver 21. Here, the known authentication data corresponds to data bits as many as the number of bits of the authentication data extracted at Step S300, from the MSB end of the 50 bit quasi random number stored in the storing section 25. Namely, in this case the number of bits of the authentication data extracted at Step S300 is 26 bits; therefore, the known authentication data is 26 bits from the MSB end of the 50 bit quasi random number.

When the authentication data is determined to accord with the known (YES at Step S310), the process advances to Step S320. Here, it is determined whether the identification information of the header of the communications packet received this-time accords with that of the header of the communications packet which is previously received and which undergoes the process at Steps S270 to S290. Namely, at Step S320, it is determined whether the first packet having the same identification information as that of the this-time received packet is received.

When determination at Step S320 is affirmed (YES at Step S320), the process advances to Step S330. Here, the original data extracted at Step S300 is stored as LSB-side data of the message data from the transmitter 11 in the storing section 25 or memory (e.g., RAM) of the controlling section 24. These processes at Steps S330 and S290 enables, in the receiver 21, restructuring (i.e., combining) of the message data exceeding four bytes that are divided into the two packets to be sent from the transmitter 11. The receiving process is then terminated.

By contrast, when the determination at Step S320 is negated (NO at Step S320) or when the authentication data is determined not to accord with the known (NO at Step S310), the process is terminated as termination with error. Here, a retransmitting request is also sent for requesting the transmitter 11 of retransmitting the same communications packet.

In the next place, a packet-missing detection process executed by the controlling section 24 of the receiver 21 will be explained with reference to a flow chart in FIG. 5. This packet-missing detection process is executed in cooperation with the process at Step S230 of the receiving process.

Figure 4:
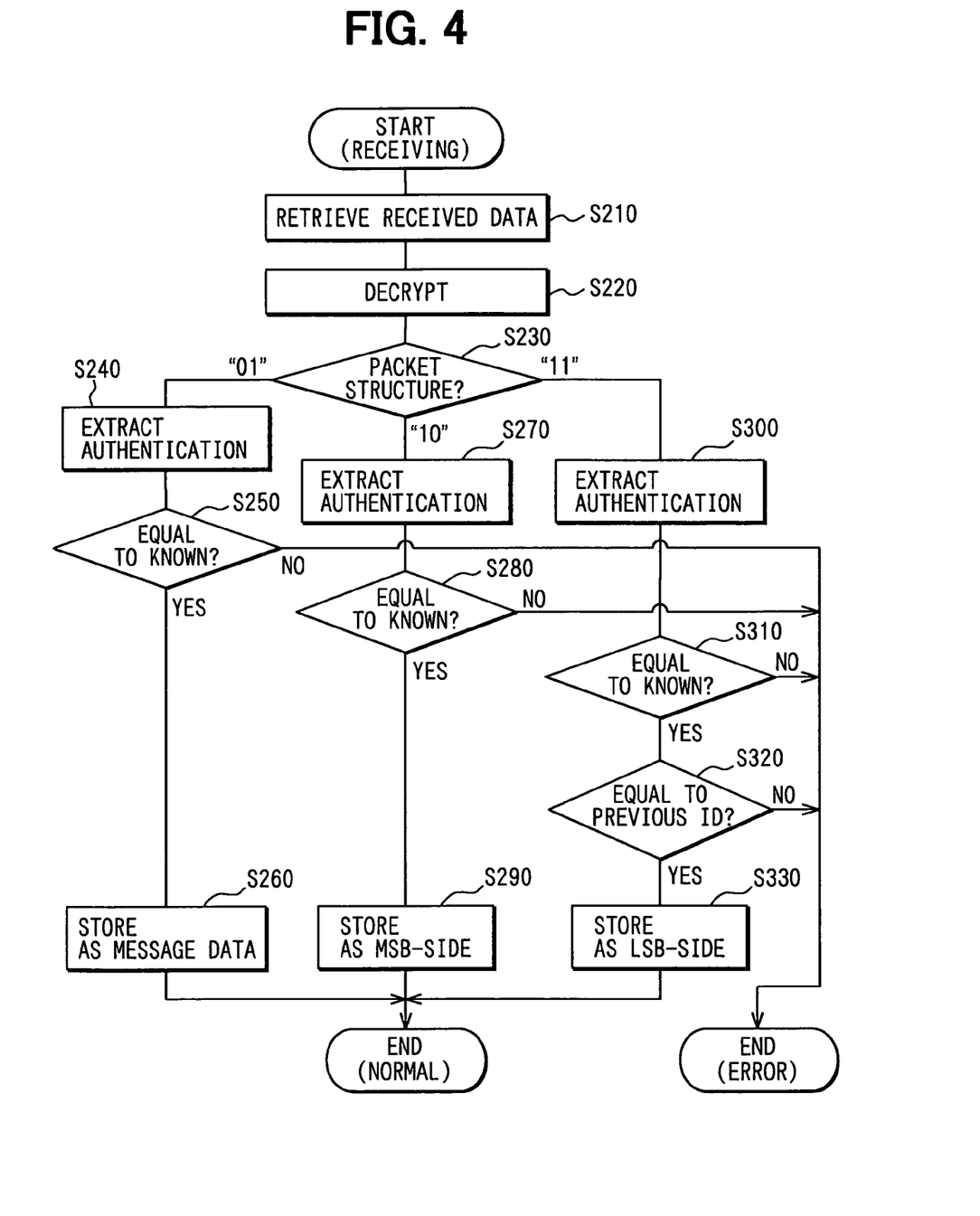
FIG. 4 is a flow chart diagram showing a receiving process of a receiver.

At Step S410, it is determined whether the this-time received communications packet is the second packet of two-packet structured packets based on the packet structure information of the control information extracted at Step S230 in FIG. 4 after the controlling section 24 of the receiver 21 starts the packet-missing detection process. Namely, it is determined whether the packet structure information this-time extracted is set to "11" or not. Further, this determination can be replaced with determination whether the previously received communications packet is the first packet of two-packet structured packets.

When the determination at Step S410 is affirmed, namely when the this-time received communications packet is the second packet of two-packet structured packets, the process advances to Step S420. Here, it is determined whether the sequence numbers of the control information extracted at Step S230 in FIG. 4 in the previously received and this-time received communications packets accord with each other.

When the determination at Step S420 is negated, or when the sequence numbers in the previously received and this-time received communications packets are determined not to accord with each other, the process advances to Step S430. Here, error-handling is executed. This packet-missing detection process is then terminated. Further, in the error-handling at Step S430, for instance, a request signal is sent for requesting the transmitter 11 of serially retransmitting from the second packet having the same sequence number as that of the previously received communications packet (namely, a packet including the LSB-side data of the same message data as that of the previously received communications packet). When the error-handling is being executed, the process following Step S240 (in detail, Steps S300 to S330) is not executed.

By contrast, when the determination at Step S410 is negated (NO at Step S410), or when the determination at Step S420 is affirmed (YES at Step S420), the packet-missing detection process is terminated.

Figure 6B:
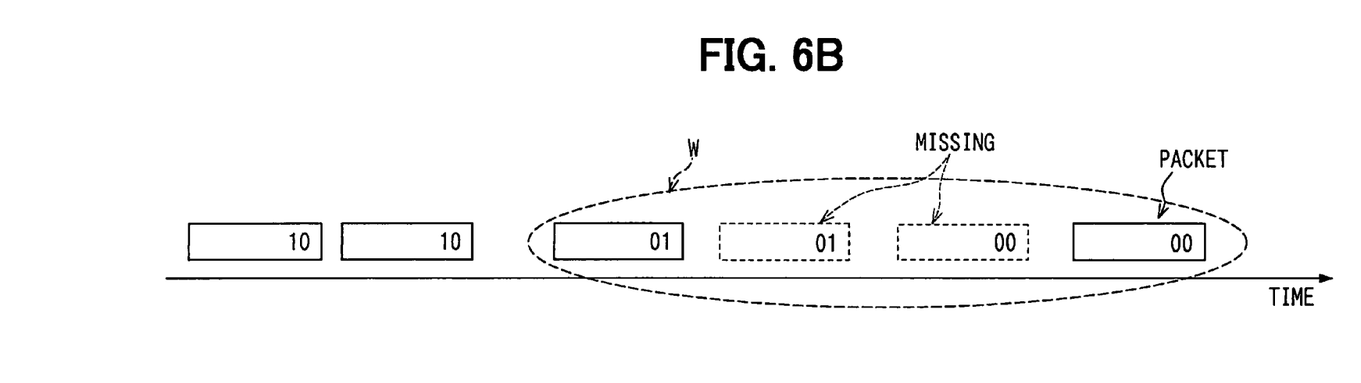
FIG. 6B is a diagram explaining an operation of a packet-missing detection process.

Thus, the packet-missing detection process enables secured detection and subsequent error-handling in a case shown within a dotted ellipse W in FIG. 6B. Here, the transmitter 11 serially transmits multiple pairs of two-packet structured packets. Each of the pairs has the same identification number, but an individual different sequence number of "00," "01," or "11." The second packet having the sequence number of "00" and the first packet having the sequence number of "01" are missed owing to any reasons and are not received. In this case, the error-handling is executed, for instance, by requesting the transmitter 11 of serially retransmitting from the second packet having the sequence number of "00."

Without including the sequence number, when the transmitter 11 transmits multiple pairs of two-packet structured packets and each of the pairs has the same identification number, the missing second packet and first packet shown in FIG. 6B are not detected. This results in combining the first packet having the sequence number of "00" with the second packet having the sequence of "01." However, with the sequence number being provided, the missing packets can be securely detected.

An example of the operation of the communications system 10 of this embodiment will be explained with reference to FIG. 7. For instance, when the transmitter 11 transmits message data having not less than five bytes, the massage data is divided into MSB-side data 1a and LSB-side data 1b. In the first place, as shown in (a) in FIG. 7, the MSB-side data 1a is then combined by authentication data (AN) and control information (C) to form the data region of the first packet, the data region which is then encrypted (S130, S140). Thereafter, as shown in (b) in FIG. 7, the encrypted data region is then combined by a header and footer regions to form a communications packet (the first packet of the two-packet structured packets), which is then sent (S150).

In the next place, the LSB-side data 1b is then combined by authentication data and control information to form the data region of the second packet, the data region which is then encrypted (S160, S170). Thereafter, as shown in (c) in FIG. 7, the encrypted data region is then combined by a header and footer regions to form a communications packet (the second packet of the two-packet structured packets), which is then sent (S180).

On the other hand, upon receiving the first packet from the transmitter 11, the receiver 21 decrypts the data region of the received packet (S220) to extract the control information, as shown in (d). The packet structure information included in the extracted control information is used for determining whether the this-time received packet is two-packet structured or one-packet structured, or whether, when being two-packet structured, it is the first or second packet of the two-packet structured packets (S230). Here, it is determined to be the first packet of the two-packet structured packets (S230→S270).

The receiver 21 extracts the data 1a and the authentication data (AN) (S270) from the this-time decrypted data region based on the data size information included in the control information to compare it with the authentication data (AN) stored in the storing section 25 (S280), as shown in (e). When the extracted authentication data accords with that stored (YES at Step S280), the above extracted data 1$a$ is stored as the MSB-side data of the message data 1 (S290).

Similarly, upon receiving the second packet from the transmitter 11, the receiver 21 decrypts the data region of the received packet (S220) to extract the control information, as shown in (f). The packet structure information included in the extracted control information is used for determining whether the this-time received packet is two-packet structured or one-packet structured, or whether, when being two-packet structured, it is the first or second packet of the two-packet structured packets (S230). Here, it is determined to be the second packet of the two-packet structured packets (S230→S300).

The receiver 21 extracts the data 1$b$ and the authentication data (AN) (S300) from the this-time decrypted data region based on the data size information included in the control information to compare it with the authentication data (AN) stored in the storing section 25 (S310), as shown in (g). When the extracted authentication data accords with that stored (YES at Step S310), the above extracted data 1$b$ is stored as the LSB-side data of the message data 1 (S330). This enables the message data 1 from the transmitter 11 to be combined in the receiver 21.

Figure 7:
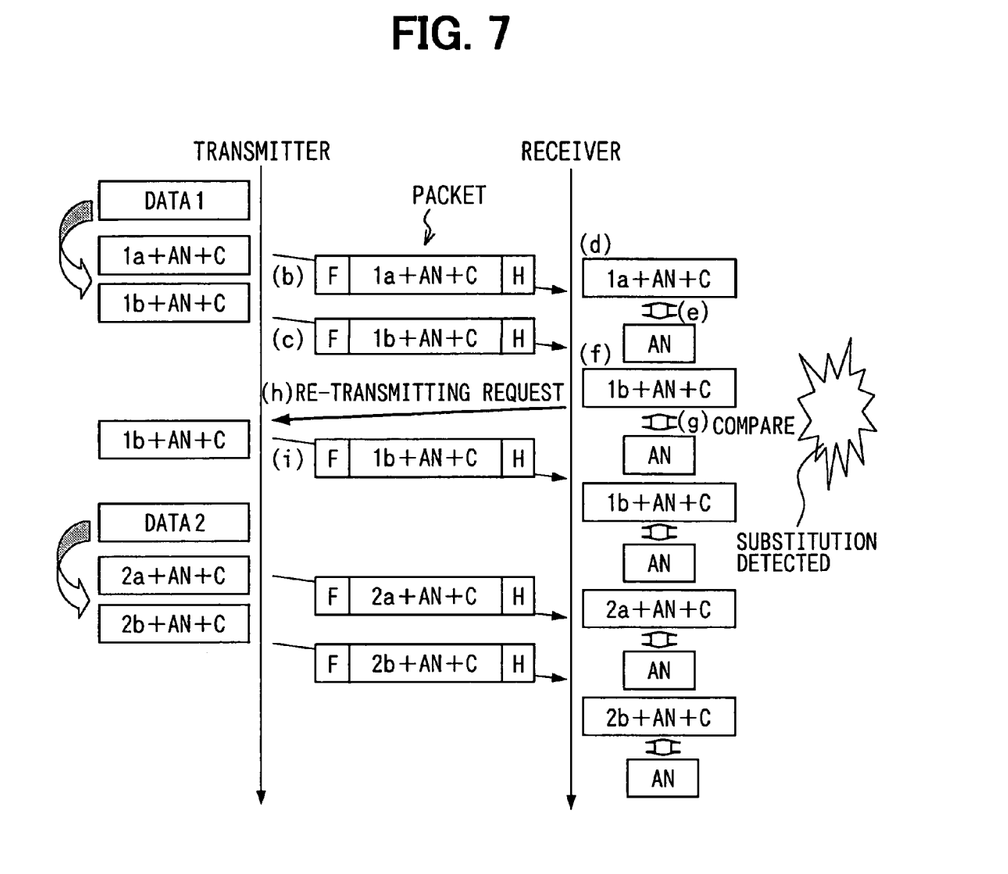
FIG. 7 is a diagram explaining an operation of a communications system according to the embodiment.

By contrast, for instance, in (g) in FIG. 7, when the extracted authentication data does not accord with that stored (NO at Step S310), the data 1$b$ of the this-time received data region is determined to be substituted, being discarded. As shown in (h), a retransmitting request is then sent to the transmitter 11 for requesting of retransmitting the same communications packet as the previously sent packet (namely, the packet including the data 1$b$).

In addition, as shown in FIG. 7, when the transmitter 11 transmits message data 2 having more than four bytes, the same process as the process where the message data 1 is sent takes place. Further, when the transmitter 11 transmits message data having not more than four bytes, the message data is not divided; however, the other process takes place in such a manner that the message data 1$a$ is sent.

In the communications system 10 of this embodiment, substitution detection is executed with respect to each of the packets into which message data is divided, so that a period for the substitution detection can be shorten. Here, the period for the substitution detection is a delay period from when communications data is substituted to when the substituted data is detected.

Further, in the communications system 10 of this embodiment, when the substitution to communications data is detected, a retransmitting request is needed only for the packet where the substitution is detected. When communication data is substituted, a frequency and volume for retransmitting data can be thereby decreased. This can restrict increase of the communications traffics in the communications line L, for instance, giving advantage when the communications line L is used as a communications line with other devices.

Furthermore, in particular, a conventional communications packet in a CAN protocol does not include such information as control information shown in FIGS. 2B, 2C and does not include a large data volume, resulting in difficulty in adopting a known message authentication method used in the Internet. By contrast, according to this embodiment, even a CAN protocol for vehicles can adopt message authentication (substitution detection for communications data).

Namely, in the communications system 10 of this embodiment, a data region of the communications packet includes: an original data region D[n] containing data of a transmission object (one of portions into which message data is divided for being contained in a single packet, or the message data itself); an authentication data region P[n] containing authentication data for substitution detection; and a control region C containing control information. This enables any protocol to adopt substitution detection with respect to each of the packets into which the message data is divided, shortening a period for the substitution detection.

Yet further, the communications system 10 of this embodiment uses authentication data having a fixed value independent of data of a transmission object, without a conventional process using a hash function. This can decrease a process volume and process period for communications. Further, a data region is encrypted, so that secrecy of the data can be secured. The authentication data is generated by using a random function, so that the authentication data is difficult to be guessed, strengthening security.

Modification 1

For instance, in the above embodiment, control information in a data region of a communications packet includes, as information indicating a structure of the data region, data size information indicating a data size of original data; however, instead of the data size information, padding size information can be included for indicating a size of the padding that is, in the data region, the other than the original data. Namely, when an alignment order of the original data, authentication data, and control information in the data region is fixed and data lengths of the entire data region and control information are fixed, the receiver 21 can recognize, from the data size of the padding, what is located in which position of the received data region.

Modification 2

In the above embodiment, at Step S140, a data region is encrypted using an encryption key previously stored in the storing section 15 by a block cipher (e.g., DES, FEAL, or the like). An encryption object can be more effectively encrypted with respect to a block unit by using the block cipher as a data size of an encryption object increases. This relatively shortens an encryption process period when the data size of the encryption object is large; performance required for hardware can be relatively low. However, a method for encryption and decryption can also use a public key scheme as needed.

Further, it can also include a stream cipher, e.g., RC4 (Rivest's Cipher 4). Using the stream cipher causes the process to be simplified, shortening the process period. Further, performance required for hardware can be even low.

Modification 3

In the above embodiment, the authentication data in a data region of a communications packet has a fixed value independent of original data of a transmission object; however, the authentication data can be a known authenticator that is generated by compressing and encrypting a feature of the data of the transmission object.

For instance, in the transmitter 11, at Steps S130, S160, and S190 of the transmitting process, a hash value is generated by applying a process of the hash function to the original data of the transmission object; then a given portion of the generated hash value is encrypted. Here, the given portion of the hash value means "58 minus DS" bits from MSB when the number of bits of the original data is DS (8 to 32 bits). Encrypted given portion of these "58 minus DS" bits is used as an authenticator substituted for the above-mentioned authentication data; this authenticator and control data are attached to the original data to form an 8-byte data region. Here, encrypting at Steps S140, S170 can be skipped. Otherwise, at Steps S140, S170, the original data alone or the original data plus control information can be encrypted. By contrast, in the receiver 21, at Steps S240 and S250, at Steps S270 and S280, and at Steps S300 and S310, respectively, a process can be executed as follows: the authenticator and original data are extracted from the data region of the this-time received packet; the extracted authenticator is decrypted to become decrypted authenticator while the process of the hash function is applied to the extracted original data to generate a hash value; certain bits as many as the number of bits of the decrypted authenticator are retrieved, from MSB, from the generated hash value; the retrieved certain bits and the decrypted authenticator are compared with each other; when the both are equal, the received original data is determined to be not substituted; and the process advances to each of Steps 260, S290, and S320. Although this modification causes the process to become a little difficult, the same effect as that of the foregoing embodiment can be obtained.

Modification 4

Figure 5:
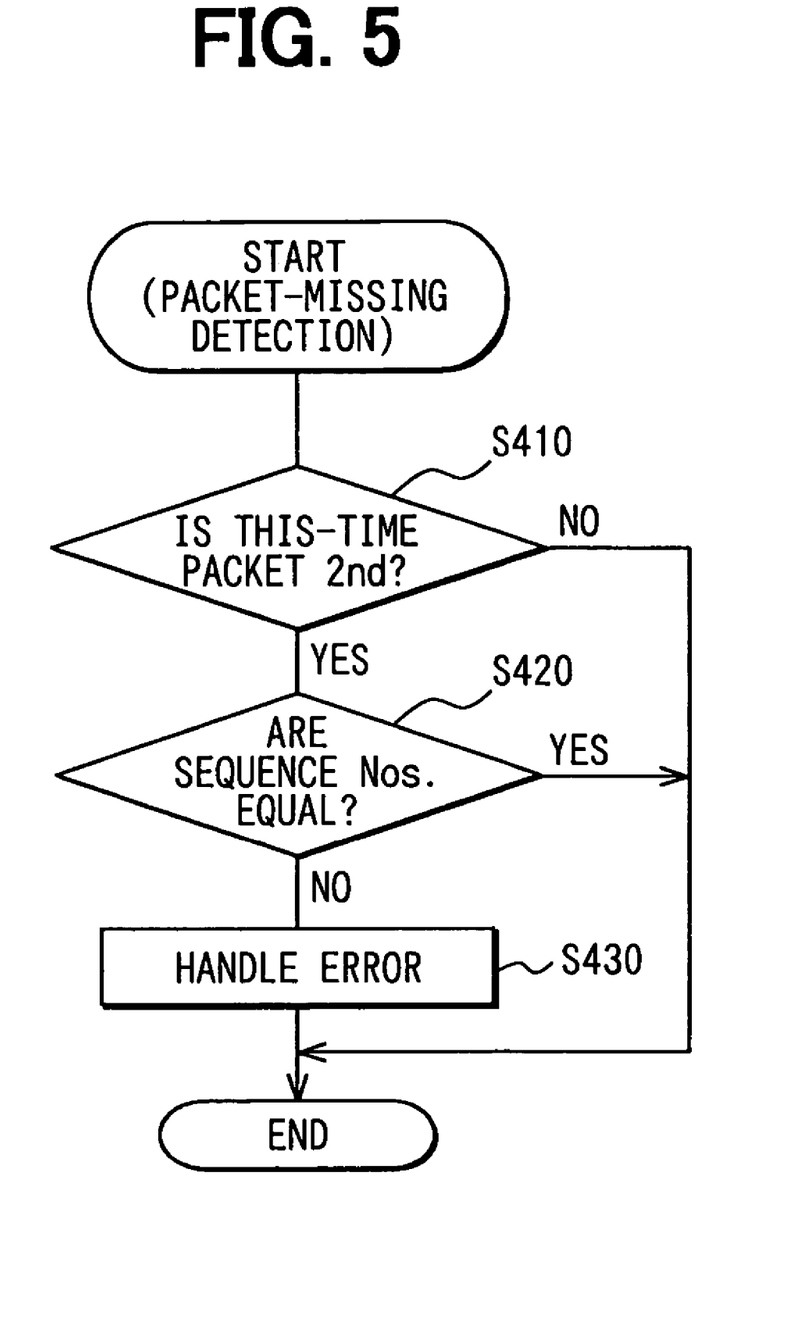
FIG. 5 is a flow chart diagram showing a packet-missing detection process of a receiver.
Figure 8:
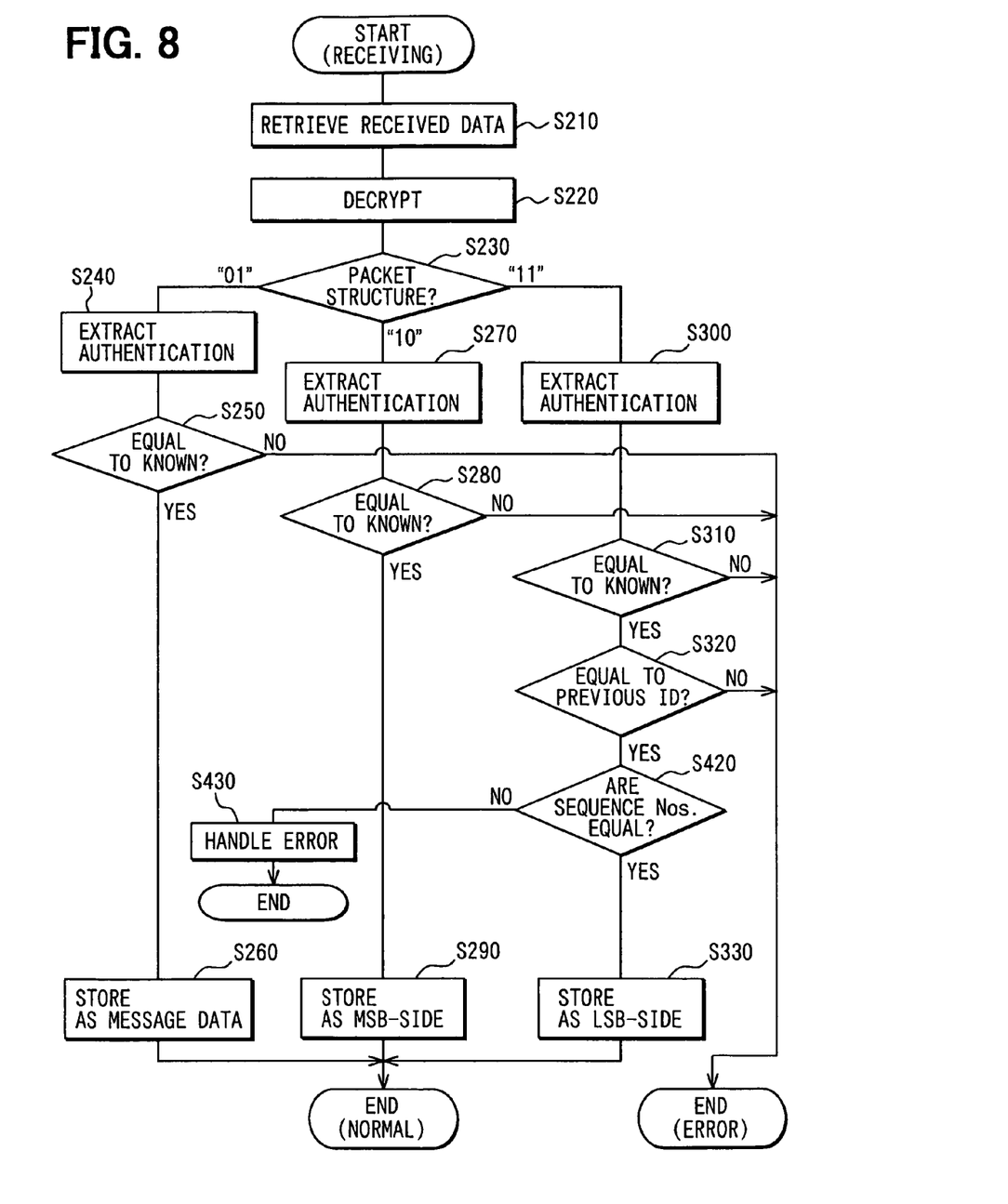
FIG. 8 is a flow chart diagram showing a modification of the embodiment.

In the above embodiment, the packet-missing detection process in FIG. 5 is executed independent of the receiving process in FIG. 4; however, it can be executed within the receiving process instead. In detail, as shown in FIG. 8, in the receiving process, when the determination at Step S320 is affirmed (YES at Step S320), the determination at Step S420 is executed. Namely, it is determined whether sequence numbers extracted at Step S230 are equal with respect to the previously and this-time received communications packets. When the determination at Step S420 is affirmed (YES at Step S420), the process advances to Step S330; when negated (NO at Step S420), to Step S430. At Step S430, error-handling is performed, terminating the receiving process.

Modification 5

Authentication data stored in the storing section 15 of the transmitter 11 and authentication data stored in the storing section 25 of the receiver 21 are not necessary exactly equal to each other. For instance, when "123456789" is stored in the storing section 15 of the transmitter 11, "ascending data from 1 to 9" can be stored in the storing section 25 of the receiver 21.

Others

When communications systems of the above embodiment and modifications are applied to vehicles, security performance of the in-vehicle communications system can be enhanced. For instance, when at least the receiver 21 is an electronic control unit mounted in a vehicle, an unauthorized act for intending to give substituted information to the receiver 21 can be restricted.

It will be obvious to those skilled in the art that various changes may be made in the above-described embodiments of the present invention. However, the scope of the present invention should be determined by the following claims.

What is claimed is:

1. A communications system where a transmitter transmits, to a receiver, message data as a plurality of packets, wherein each of the packets includes a data region comprising:
   transmission object data that is one of division portions into which the message data is divided so that each of the division portions is contained within each of the packets;
   authentication information, which is designated from first information for authentication and is used for executing substitution detection to the transmission object data, the first information being independent of the transmission object data; and
   control information that at least indicates what kind of a constituent of the message data the transmission object data is,
   wherein the transmitter is configured to
   include a transmitter-end storage for storing an encryption key and the first information for authentication,
   arrange the data region including the transmission object data, the authentication information, and the control information in a predetermined order, and
   encrypt the arranged data region using the stored encryption key to thereby generate the data region encrypted,
   wherein, when the receiver receives each of the packets, the receiver
   includes a receiver-end storage for storing a decryption key and second information that is the same as the first information stored in the transmitter-end storage,
   decrypts the data region included in the packet received from the transmitter using the decryption key stored in the receiver-end storage,
   extracts, from the decrypted data region, the transmission object data, the authentication information, and the control information,
   executes, using the authentication information extracted, a substitution detection of whether the transmission object data received is normal data that is really sent from the transmitter by verifying the authentication information extracted using the second information stored in the receiver-end storage, determining that the transmission object data is normal data really sent from the transmitter when the authentication information extracted is successfully verified, and determining that the transmission object data is abnormal data really not sent from the transmitter when the authentication information extracted is not successfully verified, and
   restructures the message data from the transmission object data received based on the control information received,
   wherein, when all the message data is included in a single packet, the transmitter forms a packet including the data region so that the transmission object data is all the message data, and the control information indicates that the transmission object data itself is the message data, and
   wherein, when the receiver receives the packet from the transmitter, the receiver treats the transmission object data received as all the message data based on the control information received that indicates that the transmission object data itself is the message data.

2. The communications system of claim 1,
wherein the flit Information awed hi the transmitter-end Stage and the second information stored in the receiver-end storage are generated by using a random function.

3. The communications system of claim 1,
wherein the control information includes Structure information Indicating a structure of the data region.

4. The communications system of claim 3,
wherein the structure Information Includes one of a data length of the transmission object data included In the data region and a data length of a padding that is other than the transmission object data.

5. The communications system of claim 1, wherein
in the transmitter, the authentication information is designated from the first information such that a data length of the authentication information is a difference resulting from subtraction of both (i) a data length of the transmission object data and (ii) a data length of the control information from a data length of the data region.

6. The communications system of claim 1 using a communications protocol for an in-vehicle local area network including a Controller Area Network.

7. The communications system of claim 1, wherein designating the authentication information from the first information uses no hash function.

8. A communications system comprising:
   a transmitter configured to transmit a packet having a packet structure, the packet being one of plurality of packets message data while stowing flint information used for authentication; and
   a receiver configured to receive the packet transmitted by the transmitter while storing second Information being Identical to the first Information for authentication, wherein
   the packet structure contains data region including:
   transmission object data that is one of division portions into which the message data is divided so that each of the division portions is contained within the packet;
   authentication information which is used for executing substitution detection to the transmission object data and is designated from the stored first information that is independent of the transmission object data; and
   control information that at least indicates what kind of a constituent of the message data the transmission object data is,
   wherein in the transmitter, the authentication information is designated from the first information such that a data length of the authentication information is a difference resulting from subtraction of both (i) a data length of the transmission object data and (ii) a data length of the control information from a data length of the data region.

9. The communications system of claim 8,
   wherein the first information for authentication is previously generated by using a random function.

10. The communications system of claim 8,
    wherein the control information includes structure information indicating a structure of the data region.

11. The communications system of claim 10,
    wherein the structure information includes at least one of (i) a data length of the transmission object data included in the data region and (ii) a data length of a padding other than the transmission object data.

12. The communications system of claim 8,
    wherein the control information includes information identifying a group of the packets, wherein the group is formed by the plurality of packets, each of which includes one of the division portions into which the same message data is divided.

13. The communications system of claim 8 using a communications protocol for an in-vehicle local area network including a Controller Area Network.

14. The communications system of claim 8, wherein designating the authentication information from the first information uses no hash function.

15. An authentication method used in a communications system where a transmitter transmits, to a receiver, message data as at least one packet, wherein the transmitter includes a transmitter-end storage for storing an encryption key and first information that is independent of the message data while the receiver includes a receiver-end storage for storing a decryption key and second information that is the same as the first information stored in the transmitter-end storage, the method comprising steps of;
   arranging, in the transmitter, a data region of a packet, the data region including, in a predetermined order, the message data and authentication information which is designated from the stored first information;
   encrypting the arranged data region using the encryption key stored in the transmitter-end storage to thereby generate the data region encrypted;
   transmitting, from the transmitter, the packet to the receiver;
   decrypting, in the receiver, the data region of the packet received from the transmitter using the decryption key stored in the receiver-end storage;
   extracting, in the receiver the message data and the authentication information from the data region decrypted;
   verifying, in the receiver, the authentication information extracted using the second information stored in the receiver-end storage; and
   determining, in the receiver, that the message data is normal data that is really sent from the transmitter when the authentication information extracted is successfully verified, and that the message data is abnormal data that is really not sent from the transmitter when the authentication information extracted is not successfully verified, wherein
   in the transmitter, the authentication information is designated from the first information such that a data length of the authentication information is a difference resulting from subtraction of a data length of the message data from a data length of the data region.

16. The authentication method of claim 15 being performed under a communications protocol for an in-vehicle local area network including a Controller Area Network.

17. The authentication method of claim 15, wherein designating the authentication information from the first information uses no hash function.

18. A communications system where a transmitter transmits, to a receiver, message data as at least one packet,
    the transmitter comprising:
    a transmitter-end storage for storing an encryption key and first information that is independent of message data and used for designating authentication information;
    arranging means for arranging for a data region for a packet, the data region including, in a predetermined order, the message data and the authentication information, which is designated from the stored first information;
    generating means for encrypting the arranged data region using the encryption key stored in the transmitter-end storage for generating the data region encrypted; and
    transmitting means for transmitting the packet to the receiver, and
    the receiver comprising:
    a receiver-end storage for storing a decryption key and second information that is the same as the first information stored in the transmitter-end storage;
    receiving means for receiving the packet sent from the transmitter;
    decrypting means for decrypting the data region of the packet received from the transmitter using the decryption key stored in the receiver-end storage;
    extracting means for extracting the message data and the authentication information from the data re ion decrypted;
    verifying means for verifying the authentication information extracted using the second information stored in the receiver-end storage; and
    determining means for determining that the message data is normal data that is really sent from the transmitter when the authentication information extracted is successfully verified, and that the message data is abnormal data that is really not sent from the transmitter when the authentication information extracted is not successfully verified, wherein in the transmitter, the authentication information is designated from the first information such that a data length of the authentication information is a difference resulting from subtraction of a data length of the message data from a data length of the data region.

19. The communications system of claim 18 using a communications protocol for an in-vehicle local area network including a Controller Area Network.

20. The communications system of claim 18, wherein designating the authentication information from the first information uses no hash function.

21. A communications system communicating a packet including transmission object data, which is either message data having a data length within a maximum data length allowed in the packet or one of portions into which message data is divided to be within the maximum data length, the communications system comprising:

a transmitter configured to transmit the packet while storing an encryption key and first information for authentication, the first information being independent of the message data; and a receiver configured to receive the packet while storing a decryption key corresponding to the encryption key stored in the transmitter and the same first information for authentication, wherein:

a data region contained in the packet is arranged in a predetermined order of (i) the transmission object data, (ii) control information having a fixed data length and indicating what kind of a constituent of the massage data the transmission object data is, and (iii) authentication information, which is designated based on the stored first information to have a data length being a difference obtained from subtraction of both (i) a variable data length of the transmission object data and (ii) the fixed data length of the control information from a data length of the data region; and the arranged data region is encrypted using the encryption key and then transmitted from the transmitter to the receiver.

22. The communications system of claim 21, wherein:

the message data includes bits equal to or less than sixty four bits;

the data region includes sixty four bits; and the data region in the packet after encrypting includes sixty four bits.

23. The communications system of claim 21 using a communications protocol for an in-vehicle local area network including a Controller Area Network.

24. The communications system of claim 21, wherein designating the authentication information from the first information uses no hash function.

\* \* \* \* \*